(12) United States Patent
Wang et al.

(10) Patent No.: US 12,253,668 B2
(45) Date of Patent: Mar. 18, 2025

(54) TWO-AXIS SCANNING MIRROR USING PIEZOELECTRIC DRIVERS AND LOOPED TORSION SPRINGS

(71) Applicant: BEIJING VOYAGER TECHNOLOGY CO., LTD., Beijing (CN)

(72) Inventors: Youmin Wang, Berkeley, CA (US); Yufeng Wang, Mountain View, CA (US); Kong Yin Ho, Mountain View, CA (US); Gary Li, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 605 days.

(21) Appl. No.: 17/566,011

(22) Filed: Dec. 30, 2021

(65) Prior Publication Data

US 2023/0204944 A1    Jun. 29, 2023

Related U.S. Application Data

(63) Continuation-in-part of application No. 17/562,799, filed on Dec. 27, 2021.

(51) Int. Cl.
*G02B 26/08* (2006.01)
*G02B 26/10* (2006.01)

(52) U.S. Cl.
CPC ....... *G02B 26/0858* (2013.01); *G02B 26/101* (2013.01)

(58) Field of Classification Search
CPC . G02B 26/0858; G02B 26/101; G02B 26/105
See application file for complete search history.

(56) References Cited

U.S. PATENT DOCUMENTS

2020/0057298 A1\* 2/2020 Boni ................ G02B 26/0858
2020/0301130 A1\* 9/2020 Boni ................ G02B 26/0858

\* cited by examiner

*Primary Examiner* — Euncha P Cherry
(74) *Attorney, Agent, or Firm* — BAYES PLLC (57) ABSTRACT

Embodiments of the disclosure provide a scanning mirror assembly. In certain configurations, the scanning mirror assembly may include a two-dimensional micro-electromechanical system (MEMS) scanning mirror, a first pair of piezoelectric electrodes coupled to the MEMS scanning mirror through a first pair of looped torsion springs, and a second pair of piezoelectric electrodes coupled to the MEMS scanning mirror through a second pair of looped torsion springs. The first pair of piezoelectric electrodes drives the MEMS scanning mirror to rotate around a first axis. The second pair of piezoelectric electrodes drives the MEMS scanning mirror to rotate around a second axis orthogonal to the first axis.

20 Claims, 9 Drawing Sheets

TWO-AXIS SCANNING MIRROR USING PIEZOELECTRIC DRIVERS AND LOOPED TORSION SPRINGS

CROSS-REFERENCE TO RELATED APPLICATIONS

This is a continuation-in-part of U.S. application Ser. No. 17/562,799, entitled "Two-Axis Scanning Mirror Using Piezoelectric Drivers," filed Dec. 27, 2021, the content of which is incorporated by reference in its entirety.

TECHNICAL FIELD

The present disclosure relates to a two-axis scanning mirror system of an optical sensing system, and more particularly to, a two-axis scanning mirror driven by two pairs of piezoelectric electrodes coupled to the mirror through looped torsion springs.

BACKGROUND

Optical sensing systems, e.g., such as LiDAR systems, have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

To scan the narrow-laser beam across a broad field-of-view (FOV) in two-dimension (2D), a scanning mirror has to be able to rotate back and forth about two different axes to scan the surrounding environment. Micro-electromechanical system (MEMS) mirror is an essential component in LiDAR scanner due to its ability to steer optical beams very rapidly. The current state-of-the art MEMS-based LiDAR applications usually require biaxial optical scanning of the surrounding environment using actuators integrated in the systems. Conventionally, 2D scanning is implemented by mounting two separate one-axis scanning mirrors on separate actuators to rotate around the respective axes. Rotation about one axis provides a fast sweep of the surrounding environment and the other axis provides a slow sweep to construct a digital 3D image of the far-field. The slow axis is typically implemented by using mechanical actuator (e.g., a galvanometer) and the fast axis can be implemented by a mechanical or solid-state actuator. The galvanometer may be configured to drive the scanning mirror to rotate about one axis (e.g., slow-sweep), and electrostatic drive combs drive the scanning mirror to rotate about the other axis (e.g., fast-sweep). Galvanometers designed for beam steering applications can have frequency responses up to 1 kHz.

However, there are several drawbacks in using two one-axis mirrors to implement a two-axis scanning mirror (also referred to as a "two-dimensional (2D) mirror") and using a galvanometer to drive the slow sweep in LiDAR systems. For example, the continued demand for further form factor reductions in optical sensing systems may be constrained. Typically, form factor reductions can be achieved by reducing the number and/or size of the elements included in the system. The two one-axis mirrors are typically placed certain distance away from each other to allow the rotation of each mirror and to accommodate the light path, and therefore taking up a certain space in the LiDAR system. Also, as compared with other elements, the galvanometer occupies a disproportionately large area within the system. Due to the mechanism by which it operates, reducing the size of the galvanometer may be difficult if not impossible to achieve. Moreover, galvanometers are expensive and often suffer from mechanical issue related to its moving parts.

Alternatively, two-axis (2D) MEMS mirrors, which are indeed capable of scanning optical beams in two axes, can be adopted to compensate for the lack of dimensionality of 1D mirrors, and thus reducing the need for a second actuator in the system. Depending on the design and driving mechanism, the mechanical performance of MEMS mirrors may vary significantly. So far only electrostatically driven and electromagnetically driven MEMS mirrors have been developed.

There is an unmet need for a 2D mirror design that can drive a MEMS mirror made of primarily single-crystal silicon into oscillation in both the x-axis and y-axis simultaneously with piezoelectric drivers in both axes.

SUMMARY

Embodiments of the disclosure provide a scanning mirror assembly. In certain configurations, the scanning mirror assembly may include a two-dimensional micro-electromechanical system (MEMS) scanning mirror, a first pair of piezoelectric electrodes coupled to the MEMS scanning mirror through a first pair of looped torsion springs, and a second pair of piezoelectric electrodes coupled to the MEMS scanning mirror through a second pair of looped torsion springs. The first pair of piezoelectric electrodes drives the MEMS scanning mirror to rotate around a first axis. The second pair of piezoelectric electrodes drives the MEMS scanning mirror to rotate around a second axis orthogonal to the first axis.

Embodiments of the disclosure also provide a transmitter for optical sensing systems. In certain configurations, the transmitter may include a light source configured to emit a light beam towards an object. In certain configurations, the scanner may include a two-dimensional micro-electromechanical system (MEMS) scanning mirror, a first pair of piezoelectric electrodes coupled to the MEMS scanning mirror through a first pair of looped torsion springs, and a second pair of piezoelectric electrodes coupled to the MEMS scanning mirror through a second pair of looped torsion springs. The first pair of piezoelectric electrodes drives the MEMS scanning mirror to rotate around a first axis. The second pair of piezoelectric electrodes drives the MEMS scanning mirror to rotate around a second axis orthogonal to the first axis.

Embodiments of the disclosure further provide a method for operating a scanner of an optical sensing system. In some embodiments, the method includes applying a first potential to a first pair of piezoelectric electrodes to drive a two-dimensional micro-electromechanical system (MEMS) scanning mirror to rotate around a first axis. The first pair of piezoelectric electrodes is coupled to the MEMS scanning mirror through a first pair of looped torsion springs. The method further includes applying a second potential to a second pair of piezoelectric electrodes to drive the MEMS scanning mirror to independently rotate around a second axis orthogonal to the first axis. The second pair of piezoelectric electrodes is coupled to the MEMS scanning mirror through a second pair of looped torsion springs.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

LiDAR is an optical sensing technology that enables autonomous vehicles to "see" the surrounding world, creating a virtual model of the environment to facilitate decision-making and navigation. An optical sensor (e.g., LiDAR transmitter and receiver) creates a 3D map of the surrounding environment using laser beams and time-of-flight (ToF) distance measurements. ToF, which is one of LiDAR's operational principles, provides distance information by measuring the travel time of a collimated laser beam to reflect off an object and return to the sensor. Reflected light signals are measured and processed at the vehicle to detect, identify, and decide how to interact with or avoid objects.

Due to the challenges imposed by using two one-axis mirrors to implement a two-axis mirror and using a galvanometer to drive the slow-sweep axis, as discussed in the BACKGROUND section above, the present disclosure provides a scanner with a true 2D scanning mirror that rotates around two axes and both axes are driven by piezoelectric drivers coupled with looped torsion springs for a more compact structure and a smoother operation. It eliminates the need for a galvanometer by including two piezoelectric drivers to drive the scanning mirror to rotate about the two axes simultaneously but independently. The looped torsion springs provide further design flexibility for adjusting the mirror oscillation frequency and the rotation angle range of the mirror, as well as reducing stress in the assembly. More specifically, the scanner of the present disclosure can include a first pair of piezoelectric electrodes coupled to the 2D scanning mirror through a first pair of looped torsion springs, driving the mirror to rotate around a first axis. The scanner also includes a second pair of piezoelectric electrodes coupled to the scanning mirror through a second pair of looped torsion springs, driving the mirror to rotate around a second axis. By eliminating the need for separate mirrors and the galvanometer, the LiDAR system of the present disclosure may be designed with significant reductions in form factor and cost as compared to conventional systems. At the same time, the scanner of the present disclosure steers a laser beam around two axes so that objects in the surrounding environment may be sensed with the degree of accuracy needed for autonomous driving and high-definition map surveys.

Some exemplary embodiments are described below with reference to a scanner used in LiDAR system(s), but the application of the scanning mirror assembly disclosed by the present disclosure is not limited to the LiDAR system. Rather, one of ordinary skill would understand that the following description, embodiments, and techniques may apply to any type of optical sensing system (e.g., biomedical imaging, 3D scanning, tracking and targeting, free-space optical communications (FSOC), and telecommunications, just to name a few) known in the art without departing from the scope of the present disclosure.

Figure 1:
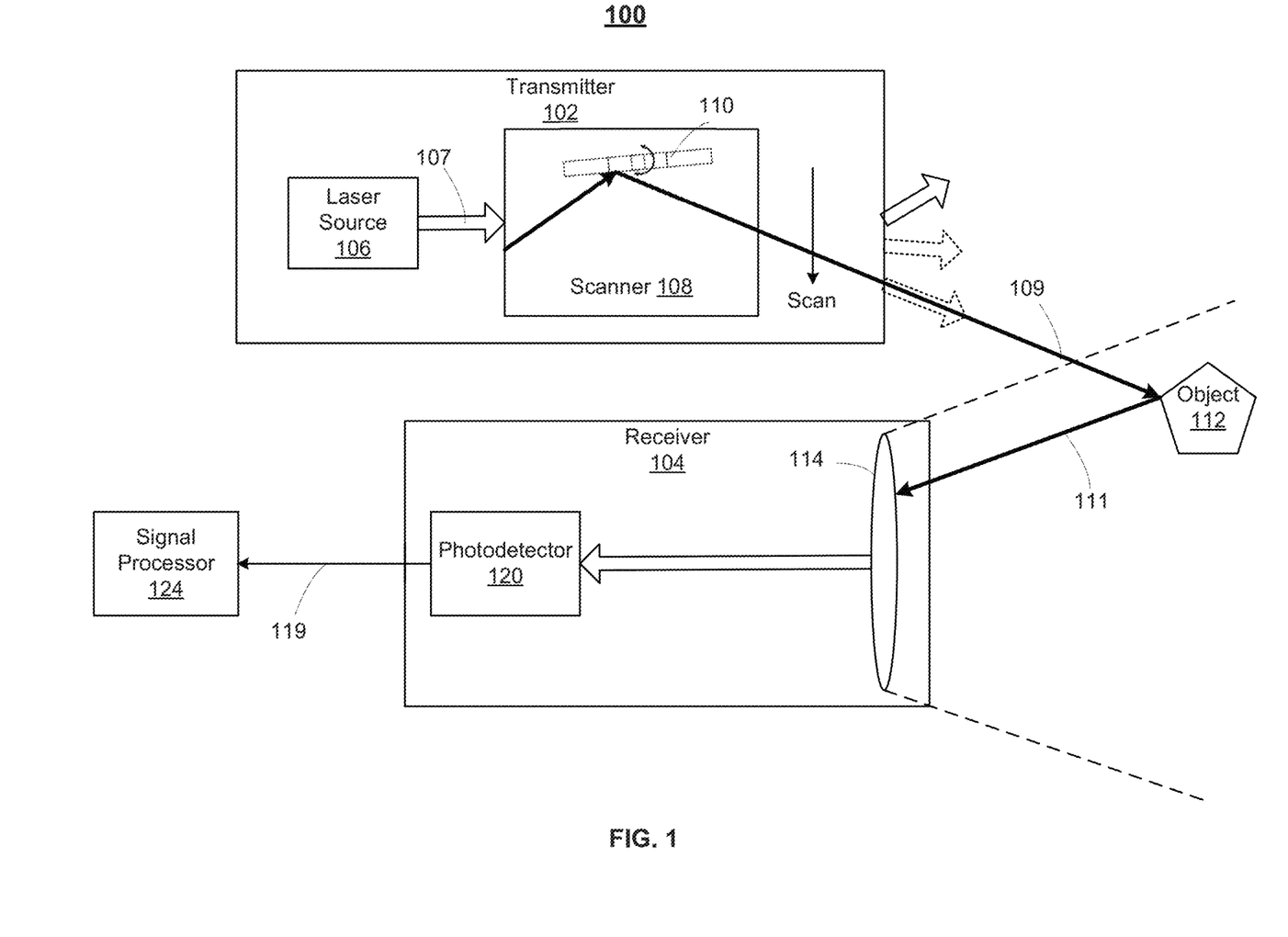
FIG. 1 illustrates a block diagram of an exemplary LiDAR system, according to embodiments of the disclosure.

FIG. 1 illustrates a block diagram of an exemplary LiDAR system 100, according to embodiments of the disclosure. LiDAR system 100 may include a transmitter 102 and a receiver 104. Transmitter 102 may emit laser beams along multiple directions. Transmitter 102 may include one or more laser source(s) 106 and a scanner 108. Scanner 108 of the exemplary LiDAR system 100 eliminates the need for a bulky and expensive galvanometer. Instead, scanner 108 includes a piezoelectric actuator with two piezoelectric drivers to rotate a scanning mirror about the two axes. In some exemplary scanning operation, one axis can be used to implement the fast-sweep and the another axis can be used to implement the slow-sweep.

Transmitter 102 can sequentially emit a stream of pulsed laser beams in different directions within a scan range (e.g., a range in angular degrees), as illustrated in FIG. 1. Light source 106 may be configured to provide a laser beam 107 (also referred to as "native laser beam") to scanner 108. In some embodiments of the present disclosure, light source 106 may generate a pulsed laser beam in the ultraviolet, visible, or near infrared wavelength range.

In some embodiments of the present disclosure, light source 106 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 107 provided by a PLD may be greater than 700 nm, such as 760 nm, 785 nm, 808 nm, 848 nm, 905 nm, 940 nm, 980 nm, 1064 nm, 1083 nm, 1310 nm, 1370 nm, 1480 nm, 1512 nm, 1550 nm, 1625 nm, 1654 nm, 1877 nm, 1940 nm, 2000 nm, etc. It is understood that any suitable laser source may be used as light source 106 for emitting laser beam 107. In certain configurations, a collimating lens may be positioned between light source 106 and scanner 108 and configured to collimate laser beam 107 prior to impinging on the MEMS mirror 110. MEMS mirror 110, at its rotated angle, may deflect the laser beam 107 generated by laser sources 106 to the desired direction, which becomes collimated laser beam 109.

Scanner 108 may be configured to steer a collimated laser beam 109 towards an object 112 (e.g., stationary objects, moving objects, people, animals, trees, fallen branches, debris, metallic objects, non-metallic objects, rocks, rain, chemical compounds, aerosols, clouds and even single molecules, just to name a few) in a direction within a range of scanning angles. In some embodiments consistent with the present disclosure, scanner 108 may include, among others, a micromachined mirror assembly having a 2D scanning mirror, such as a MEMS mirror 110 that is individually rotatable about a first axis and a second axis. In some exemplary scanning applications, the first axis (also referred to herein as "x-axis") may be associated with the fast-sweep or a high-frequency oscillation, and the second axis (also referred to herein as the "y-axis") may be associated with the slow-sweep or a low-frequency oscillation.

In some embodiments, at each time point during the scan, scanner 108 may steer light from the light source 106 in a direction within a range of scanning angles by rotating the micromachined mirror assembly concurrently (also referred to herein as "simultaneously") about the first axis and the second axis. That is, the rotations of the 2D scanning mirror about the x-axis and the y-axis can be independent from each other but can occur simultaneously. The range of scanning angles can be designed based on, among others, the Q-factor of the scanning mirror, the voltages applied to the various drivers, the spring constants, and overall system design, etc.

The micromachined mirror assembly may include various components that enable, among other things, the rotation of the MEMS mirror 110 around different axes. For example, the components may include a 2D scanning mirror (e.g., MEMS mirror 110), and a piezoelectric actuator that includes a first piezoelectric driver configured to rotate the scanning mirror around a first axis and a second piezoelectric driver configured to rotate the scanning mirror around a second axis. The first piezoelectric driver includes a first pair of piezoelectric electrodes positioned orthogonally across the first axis and the second piezoelectric driver includes a second pair of piezoelectric electrodes positioned orthogonally across the second axis. In some configurations, the piezoelectric actuator can further include a stage at its geometric center, a first pair of looped torsion spring positioned along the second axis to join the first pair of piezoelectric electrodes to the stage, and a second pair of looped torsion springs positioned along the first axis to join the second pair of piezoelectric electrodes to the stage. The pairs of looped torsion springs can be designed to have appropriate spring constants in order to achieve specific mirror oscillation frequencies in the two axes, the rotation angle ranges in the two axes, and to limit the stress in the mirror assembly.

In some further configurations, the 2D scanning mirror may be a single layer of silicon coated with a reflective metal layer. A post may protrude from the back surface of the 2D scanning mirror. The post connects the 2D scanning mirror with the piezoelectric actuator, in order to make sufficient space for the mirror to rotate or oscillate during a scanning operation. In certain aspects, one or more of the components of scanner 108 may be formed on a single crystal silicon. For example, the scanning mirror, the first driver, and the second driver, just to name a few, may be formed on a single crystal silicon. Additional details of exemplary scanning mirror assembly are set forth below in connection with FIGS. 2A-2D.

Still referring to FIG. 1, in some embodiments, receiver 104 may be configured to detect a returned laser beam 111 returned from object 112. The returned laser beam 111 may be in a different direction from laser beam 109. Receiver 104 can collect laser beams returned from object 112 and output electrical signals reflecting the intensity of the returned laser beams. Upon contact, laser light can be reflected by object 112 via backscattering, e.g., such as Raman scattering and fluorescence. As illustrated in FIG. 1, receiver 104 may include a lens 114 and a photodetector 120. Lens 114 may be configured to collect light from a respective direction in its FOV and converge the laser beam to focus before it is received on photodetector 120. At each time point during the scan, returned laser beam 111 may be collected by lens 114. Returned laser beam 111 may be returned from object 112 and have the same wavelength as laser beam 109.

Photodetector 120 may be configured to detect returned laser beam 111 returned from object 112. In some embodiments, photodetector 120 may convert the laser light (e.g., returned laser beam 111) collected by lens 114 into an electrical signal 119 (e.g., a current or a voltage signal). Electrical signal 119 may be generated when photons are absorbed in a photodiode included in photodetector 120. In some embodiments of the present disclosure, photodetector 120 may include a PIN detector, a PIN detector array, an avalanche photodiode (APD) detector, a APD detector array, a single photon avalanche diode (SPAD) detector, a SPAD detector array, a silicon photo multiplier (SiPM/MPCC) detector, a SiP/MPCC detector array, or the like.

LiDAR system 100 may also include at least one signal processor 124. Signal processor 124 may receive electrical signal 119 generated by photodetector 120. Signal processor 124 may process electrical signal 119 to determine, for example, distance information carried by electrical signal 119. Signal processor 124 may construct a point cloud based on the processed information. Signal processor 124 may include a microprocessor, a microcontroller, a central processing unit (CPU), a graphical processing unit (GPU), a digital signal processor (DSP), or other suitable data processing devices.

Figure 2A:
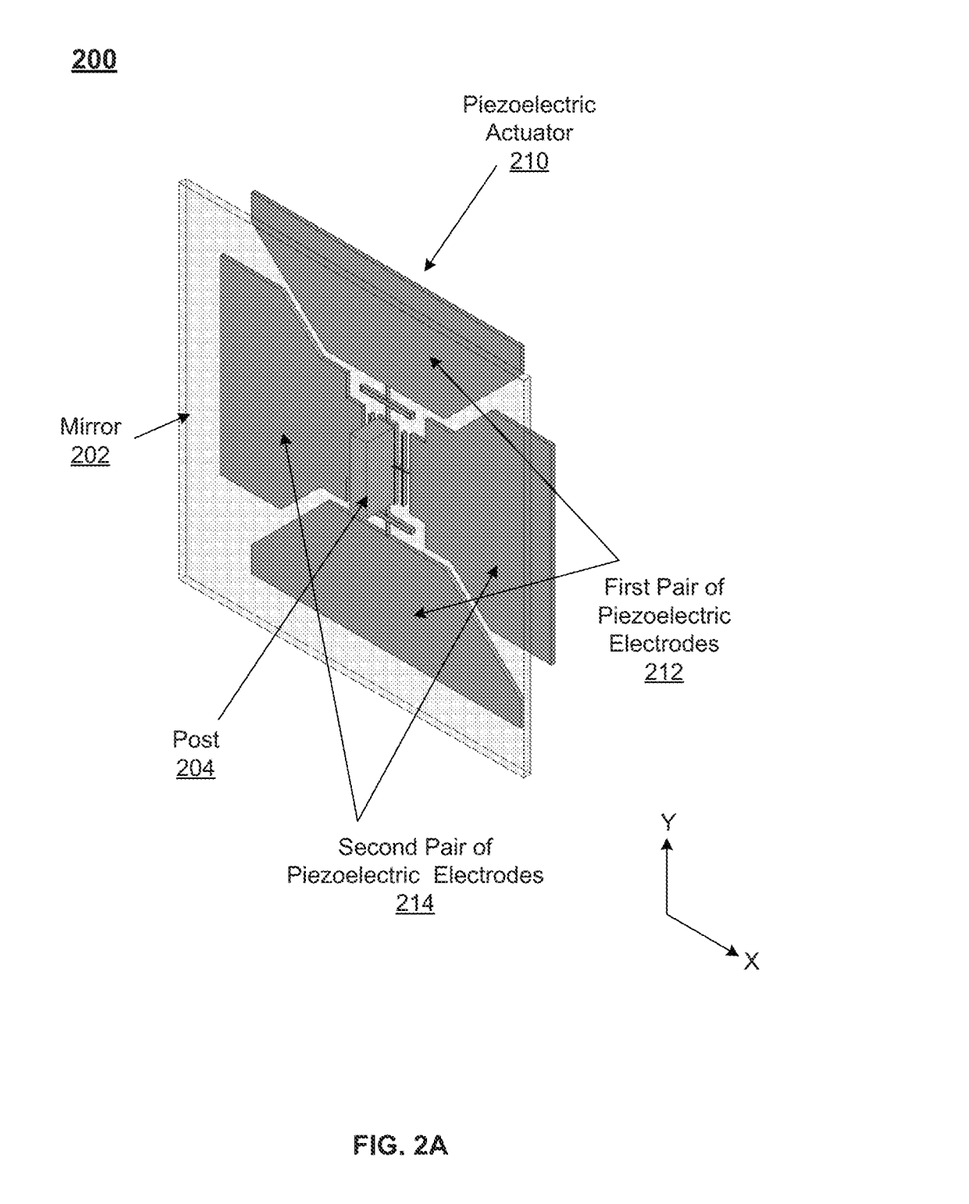
FIG. 2A illustrates a first perspective view of an exemplary two-axis scanning mirror assembly, according to embodiments of the disclosure.
Figure 2B:
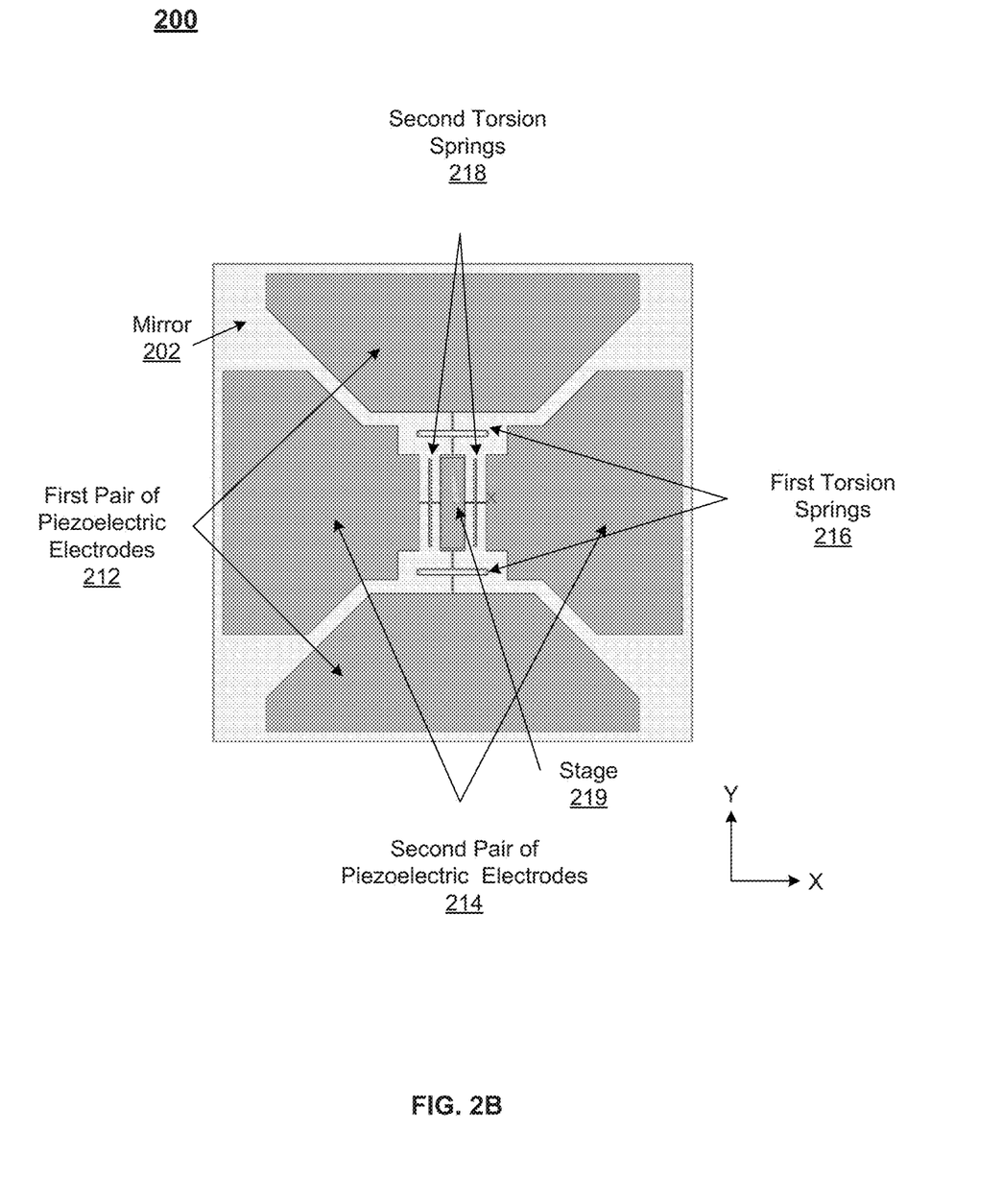
FIG. 2B illustrates a second perspective view of the exemplary two-axis scanning mirror assembly of FIG. 2A, according to embodiments of the disclosure.
Figure 2C:
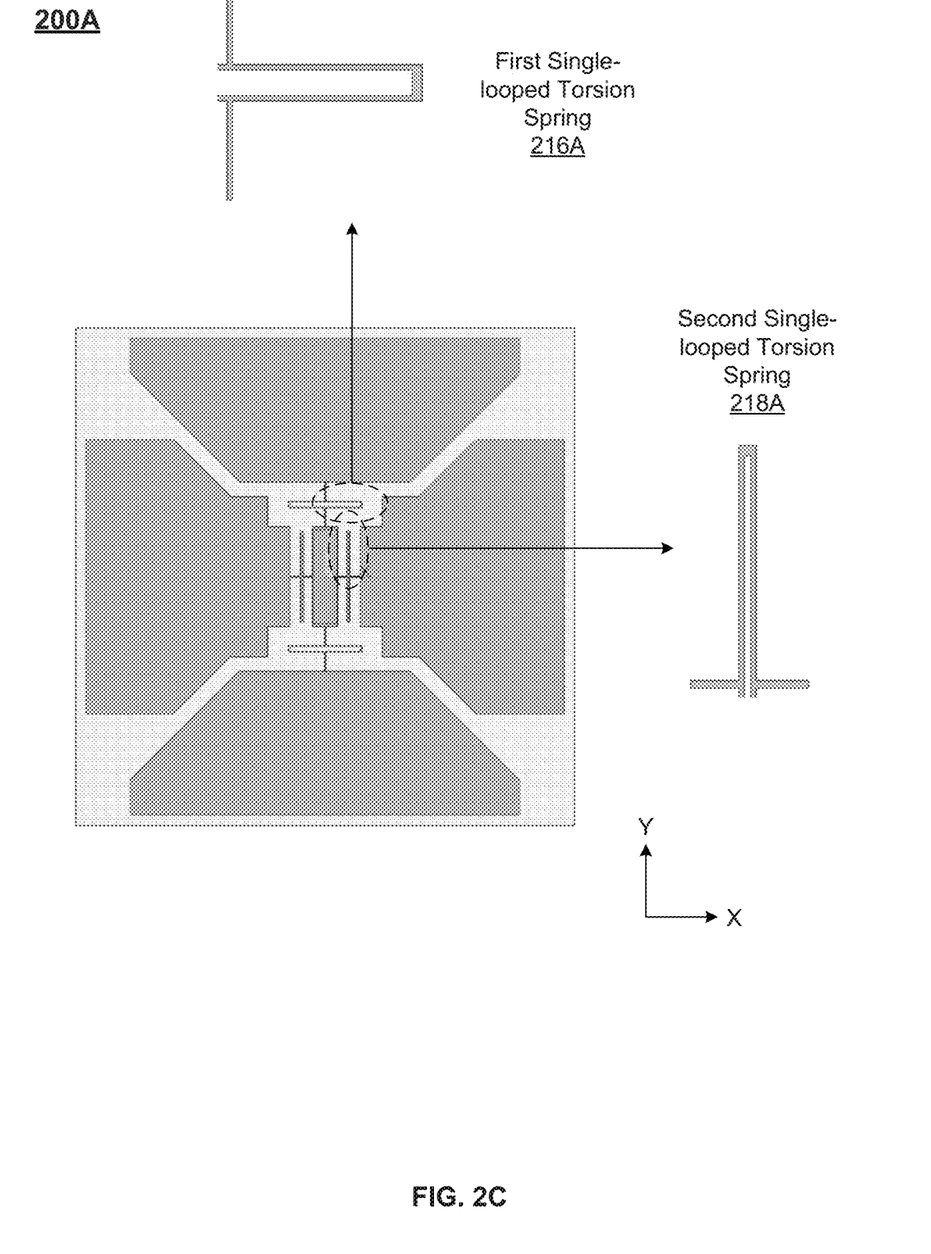
FIG. 2C illustrates an exemplary two-axis scanning mirror assembly that uses single-looped torsion springs in both axes, according to embodiments of the disclosure.
Figure 2D:
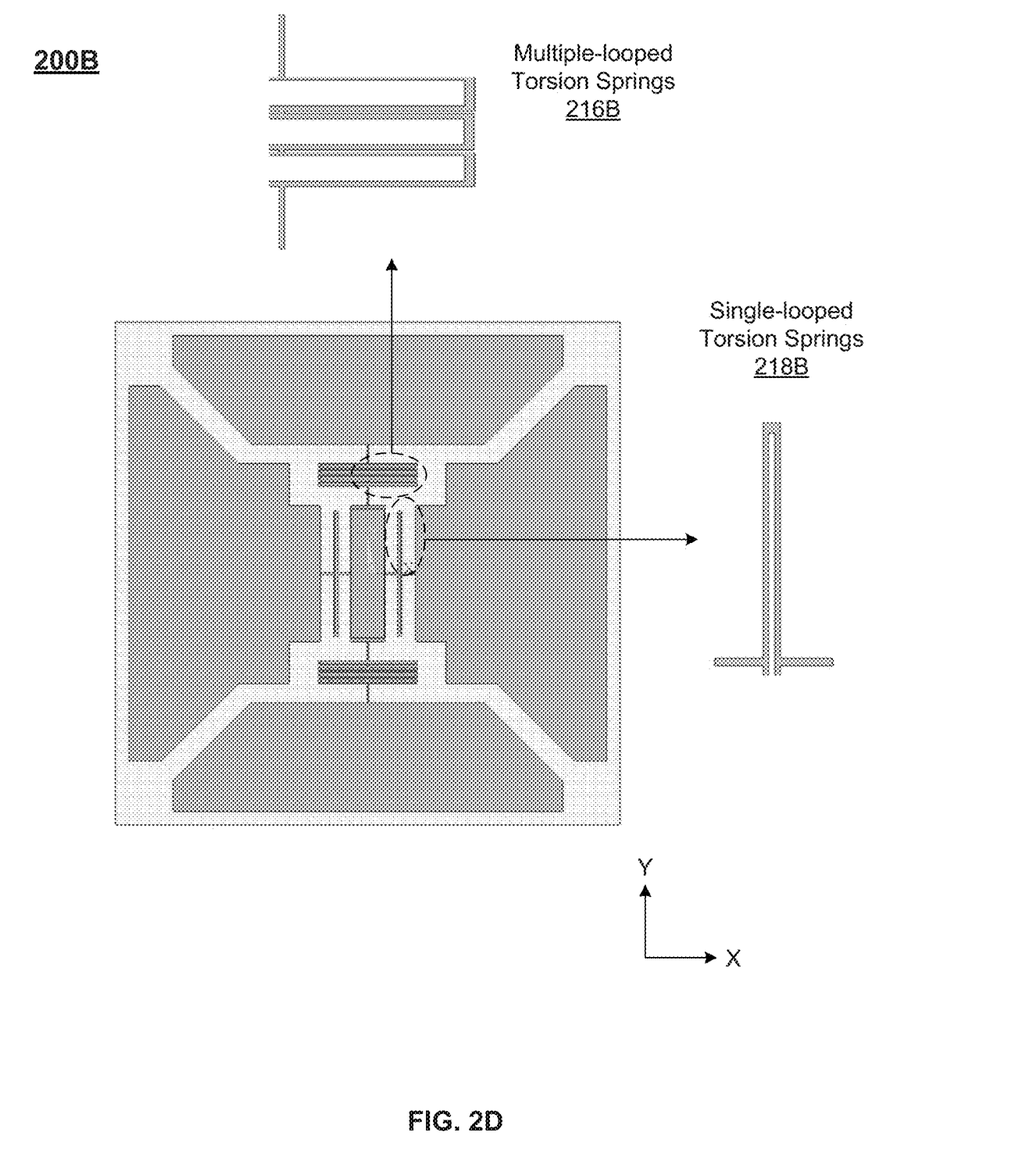
FIG. 2D illustrates an exemplary two-axis scanning mirror assembly that uses multiple-looped torsion springs in one axis, according to embodiments of the disclosure.

FIG. 2A illustrates a first perspective view of an exemplary two-axis scanning mirror assembly 200, according to embodiments of the disclosure. FIG. 2B illustrates a second perspective view of the exemplary two-axis scanning mirror assembly 200 of FIG. 2A, according to embodiments of the disclosure. FIG. 2C illustrates an exemplary two-axis scanning mirror assembly 200A that uses single-looped torsion springs in both axes, according to embodiments of the disclosure. FIG. 2D illustrates an exemplary two-axis scanning mirror assembly 200B that uses multiple-looped torsion springs in one axis, according to embodiments of the disclosure.

Referring to FIG. 2A, scanning mirror assembly 200 is a "stack" composed of several components. On the very top of the stack is a mirror 202. Mirror 202 can be a 2D scanning mirror that is rotatable around two orthogonal axes, the x-axis and the y-axis, as labeled in FIG. 2A. The x-axis is also referred to as the first axis and the y-axis is referred to as the second axis throughout the descriptions of FIGS. 2A-2D. In some embodiments, mirror 202 can be a MEMS mirror formed with a single layer of silicon coated with a reflective metal layer, when the mirror size is within a certain threshold. Such a single crystal silicon mirror could oscillate at smaller driving forces and rotate at higher speed, thus making the scanning operation faster and more efficient. While a square mirror is illustrated as an example in FIGS. 2A and 2B, it is contemplated that the shape of the mirror could be customized to, e.g., rectangular, circular, triangular, or polygonal, for different applications.

At the very bottom of the stack, scanning mirror assembly 200 may further include a piezoelectric actuator 210 configured to drive mirror 202, e.g., to rotate around the two axes (x-axis and y-axis), or to vibrate along a third axis normal to the x-y plane (z-axis, not shown). As shown in both FIG. 2A and FIG. 2B, piezoelectric actuator 210 includes two piezoelectric drivers configured to drive mirror 202 to rotate around the two-axes, respectively. As the two piezoelectric drivers operate independent from each other, the rotations of mirror 202 around the two axes are also independent and individual.

In some embodiments, piezoelectric actuator 210 may be bonded to a ceramic substrate (not shown) to form a scanning mirror assembly package. With the use of a two-axis MEMS mirror and piezoelectric drivers for both axes, the size of the assembly package can be made compact.

In some embodiments, as shown in both FIG. 2A and FIG. 2B the first piezoelectric driver may include a first pair of piezoelectric electrodes 212 and second pair of piezoelectric electrodes 214. The piezoelectric electrodes in the first pair are positioned along the second axis (the y-axis) orthogonally across the first axis (the x-axis). The piezoelectric electrodes in the second pair are positioned along the first axis (the x-axis) orthogonally across the second axis (the y-axis). In some configurations, each piezoelectric electrode in the first pair and the second pair may include a relatively thicker silicon plate (e.g., from 10 μm up to 200 μm) coated with a thin piezoelectric film (e.g., 2 μm nominal), such as a lead zirconate titanate (PZT) film. When the electrodes are formed with the PZT films, the piezoelectric driver may be referred to as a PZT driver.

The first piezoelectric driver and the second piezoelectric driver are configured to drive mirror 202 to rotate around the two axes using a converse piezoelectric effect when voltages are applied to the piezoelectric electrodes. For example, one end of each of the first piezoelectric driver and the second piezoelectric driver is affixed to an anchor, and the other end is coupled to the mirror 202 through a pair of looped torsion springs. Accordingly, under a drive voltage, the combination of PZT film and silicon support underneath will result in an up or down motion relative to the anchor and provide a force/torque through the loped torsion springs to rotate the mirror about a particular axis. Piezoelectricity is the property of some materials (e.g., PZT, barium titanate, lead titanate, gallium nitride, zinc oxide, etc.) to develop electric charge on their surface when mechanical stress is exerted on them. An applied electrical field produces a linearly proportional strain in these materials. The electrical response to mechanical stimulation is called the direct piezoelectric effect, and the mechanical response to electrical simulation is called the converse piezoelectric effect, which is the mechanism by which the first and second piezoelectric drivers drive mirror 202 to rotate around the x and y axes.

Each piezoelectric film (e.g., PZT film) in the piezoelectric electrodes has a plurality of interlocking crystal domains that have both positive and negative charges. When voltage is not applied to the piezoelectric films, the piezoelectric film and silicon plate on which the film is formed may remain in a neutral position. When a voltage is applied to a piezoelectric film, an outer electrical field is generated that either stretches or compresses the crystal domains in the piezoelectric film causing mechanical strain. When a voltage is applied across a piezoelectric film, the induced strain may cause a pushing (e.g., stretching) or pulling (e.g., compression) of the film depending on whether the voltage is positive or negative. The strain in piezoelectric films may cause stretching and compression of the comparatively rigid silicon plates on which they are formed.

In some embodiments, as shown in FIG. 2B, piezoelectric actuator 210 has a stage 219 in its geometric center. Stage 219 provides a base for other components to join each other. In some configurations, as shown in FIG. 2A, mirror 202 and piezoelectric actuator 210 are connected by a post 204. Post 204 may be a column with any cross-sectional shape, for example, round, elliptical or rectangular, etc. Post 204 is formed on the back surface (e.g., the non-reflective surface) of mirror 202 and protrudes from that surface. For example, post 204 may be formed from one-step or two steps DRIE etch from the back of SOI wafers depending on weather the back skeleton support is needed or not. The forming of post 204 may also be achieved through alternative silicon processing sequences. With post 204 in between, mirror 202 and piezoelectric actuator 210 are spaced for a certain distance away from each other. In some embodiments, the height of post 204 may be set to ensure a threshold distance between mirror 202 and piezoelectric actuator 210, so that mirror 202 can rotate/oscillate about the x-axis and y-axis without touching piezoelectric actuator 210. The threshold distance may be determined according to the desired FOV of the scanner. In some embodiments, the height of post 204 may be 500-1000 μm.

In some embodiments, piezoelectric actuator 210 further includes torsion springs along both axes. For example, as shown in FIG. 2B, first torsion springs 216 may be positioned along the first axis (x-axis) and configured to facilitate rotation around the first axis. As illustrated in FIG. 2B, first torsion springs 216 may include two spring parts each located on one side of stage 219 and connect a respect electrode in first pair of piezoelectric electrodes 212 to stage 219. Similarly, second torsion springs 218 may positioned along the second axis (y-axis) and configured to facilitate rotation around the second axis. As illustrated in FIG. 2B, the second pair of torsion springs 218 may also include two spring parts each located on one side of stage 219 and connect a respect electrode in second pair of piezoelectric electrodes 214 to stage 219. In some embodiments, the first and second torsion springs 216 and 218 may be close-looped torsion springs (also referred to as looped torsion springs).

The first and second torsion springs 216 and 218 may each have a spring constant that is implementation specific. Example spring constants for the torsion springs may be as large as one Newton-meter (N*m). By way of example and not limitation, for a 4×12 $mm^2$ mirror, the torsion spring constant may be 0.04 N*m; for a 6×12 $mm^2$, the torsion spring constant may be 0.1 N*m; for a 10×15 $mm^2$, the torsion spring constant may be up to 1 N*m.

In some embodiments, first torsion springs 216 and second torsion springs 218 may adopt different designs, such as the number of loops and the dimension of each loop within the torsion spring, in order to adjust their spring constants. For some configurations, the designs are predetermined according to various factors for designing the scanning mirror assembly. First factor is the mirror oscillation frequency. The spring constant is linearly proportional to the square of a mirror oscillation frequency. In some configurations, first pair of piezoelectric electrodes 212 can drive mirror 202 to oscillate around the first axis at a first frequency, and second pair of piezoelectric electrodes 214 can drive mirror 202 to oscillate around the second axis at a second frequency. In some applications, the slow-axis and fast-axis scanning of scanner 108 may be implemented by scanning mirror assembly 200. In an embodiment where the x-axis is implemented as the fast axis and the y-axis as the slow axis, the first frequency is set to be higher than the second frequency. For example, the first frequency can be 1 kHz, 5 kHz, 10 kHz, 20 kHz, 100 kHz, etc., and the second frequency can be 5 Hz, 10 Hz, 20 Hz, 50 Hz, 100 Hz, etc. Other frequencies suitable for scanning operation may be used. The pair of torsion springs of the respect axis is designed to support the target oscillation frequency of that axis. For example, for a looped torsion spring, the overall dimension of the spring (e.g., length L and width W) can be determined by the size of each loop and the number of loops included in the spring. Because the spring constant of the torsion spring is correlated to its overall dimension, the constant can be adjusted by changing these two parameters, especially the number of loops. More specifically, the spring constant essentially proportional to the cubic power of width W and inversely proportional to the cubic power of length $L : \sim (W/L)^3$.

The second factor is the rotation angle range of the mirror. The rotation angle range is designed according to the desired scanning field-of-view (FOV) of the scanner. For example, mirror 202 may be designed to rotate within a −15° to +15° in each axis. In some other examples, the rotation angle range can be any other suitable ranges such as −5° to +5°, or −10° to +10°. It is also contemplated that the rotation angle ranges of the two axes can be the same or different. The range of scanning angles can be designed based on, among others, the Q-factor (quality factor) of the scanning mirror, the voltages applied to the various drivers, the spring constants of the torsion springs, and overall system design, etc.

The third factor is the stress in the scanning mirror assembly, such as stress in the silicon of mirror 202 or the pairs of piezoelectric electrodes (212 or 214). The design goal is to minimize the stress in order to improve the reliability of the mirror. Typically, more loops in the torsion spring could result in a lower stress.

Based on the three factors, the looped torsion springs in first and second torsion springs 216 and 218 may contain a single loop or multiple loops. For example, FIG. 2C illustrates two-axis scanning mirror assembly 200A that uses first single-looped torsion springs 216A and second single-looped torsion springs 218A in both axes. The enlarged views of the torsion springs show that while both first single-looped torsion springs 216A and second single-looped torsion springs 218A contain a single loop, the dimensions (e.g., the width and/or height of each fold) of the loops in the respective torsion springs are different. In the example shown by FIG. 2C, first single-looped torsion springs 216A has a shorter length dimension, and thus a larger spring constant, than second single-looped torsion springs 218A.

In another example, FIG. 2D illustrates an exemplary two-axis scanning mirror assembly 200B that uses multiple-looped torsion springs 216B in one axis (e.g., the y-axis) and single-looped torsion springs in the other axis (e.g., the x-axis). For example, multiple-looped torsion springs 216B may include three loops. With a longer length in each loop and more loops, first single-looped torsion springs 216B therefore has an even longer overall length, and thus a smaller or much smaller spring constant, than second single-looped torsion springs 218B. Although FIG. 2D shows an example with more loops in the y-axis torsion springs than the x-axis torsion springs, it is contemplated that other configurations may use more loops in the x-axis torsion springs than the y-axis torsion springs. Furthermore, it is also contemplated that the multiple-looped torsion springs can include any suitable number of loops, depending on the evaluation of the factors above, and not limited to three, as shown in FIG. 2D merely as an example.

FIG. 2C and FIG. 2D are non-limiting examples of scanning mirror assemblies that have different torsion spring designs. It is contemplated that the torsion springs of the two axes (e.g., first torsion springs 216 and second torsion springs 218) could be any combination of single- and multiple-looped torsion springs. For example, although not shown, first torsion springs 216 and second torsion springs 218 can both be multiple-looped torsion springs with the same or different number of loops.

The mechanical strain caused by the voltage potential applied to a piezoelectric electrode may be passed onto the respective torsion spring. The torsion spring may be stretched or compressed by the force, which in turn rotate or twist stage 219. For example, first torsion springs 216 may cause stage 219 to rotate about the first axis (the x-axis) and second torsion springs 218 may cause stage 219 to rotate about the second axis (the y-axis).

Figure 3A:
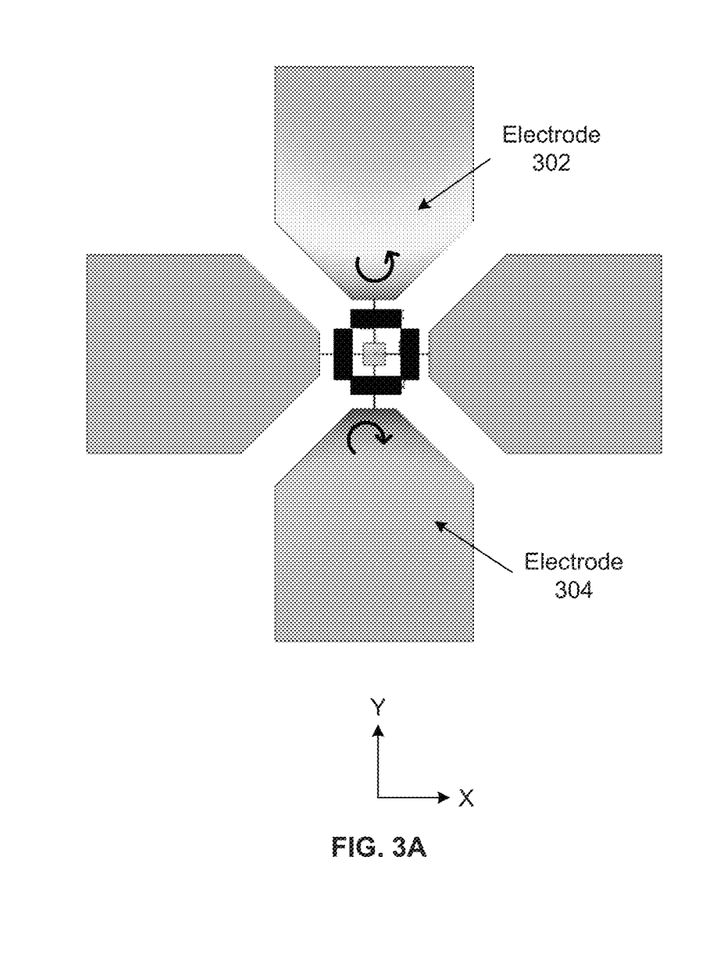
FIG. 3A and FIG. 3B illustrate an x-axis rotation of an exemplary scanning mirror when a potential is applied to a first pair of piezoelectric electrodes, according to embodiments of the disclosure.
Figure 3B:
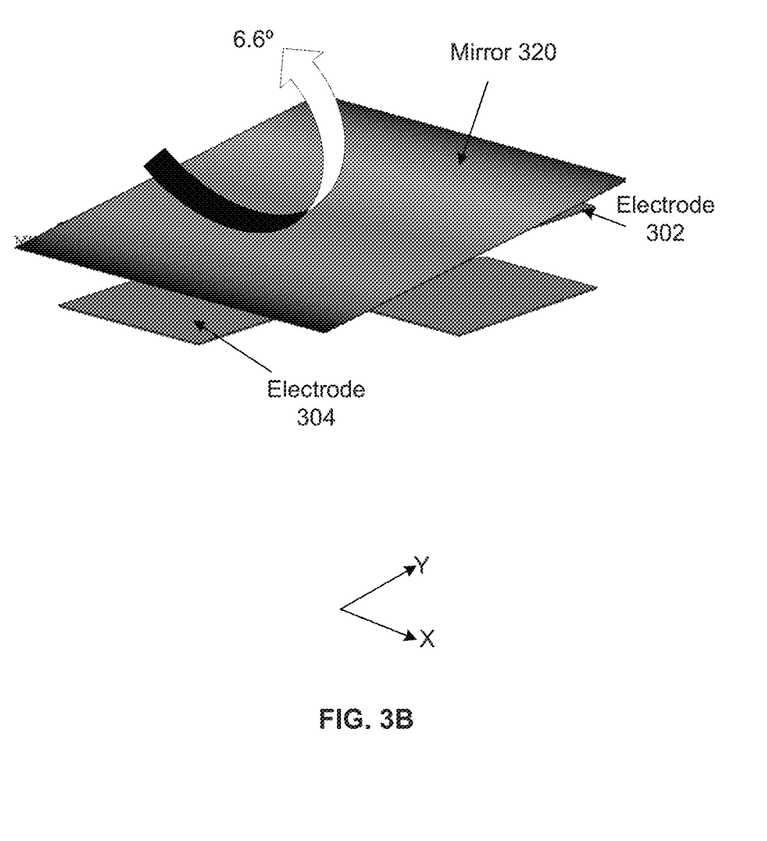
Figure 4A:
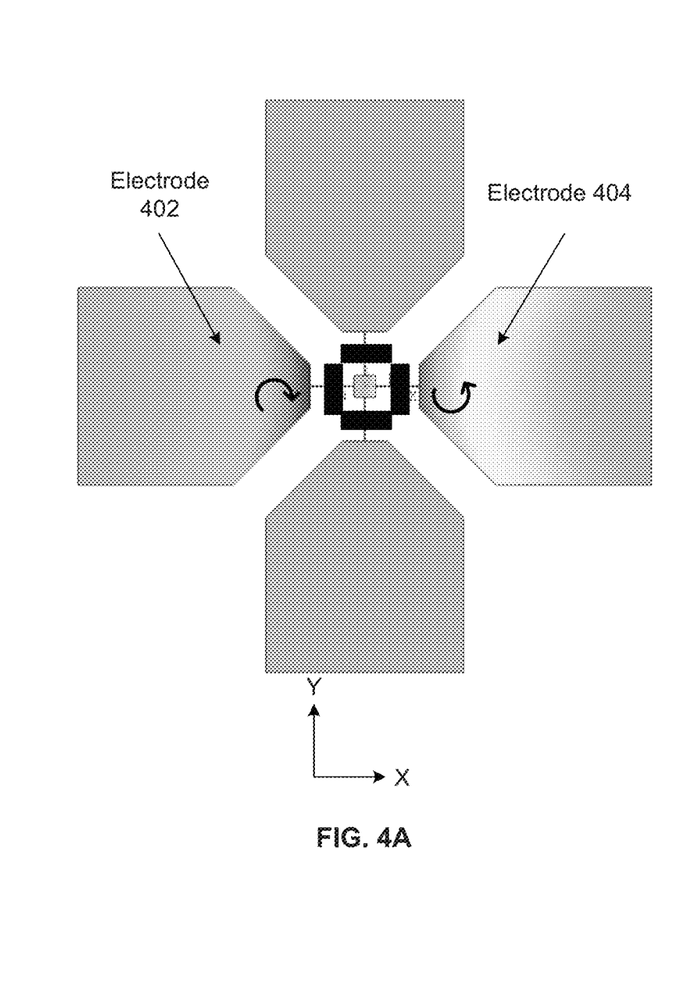
FIG. 4A and FIG. 4B illustrate a y-axis rotation of an exemplary scanning mirror when a potential is applied to a second pair of piezoelectric electrodes, according to embodiments of the disclosure.
Figure 4B:
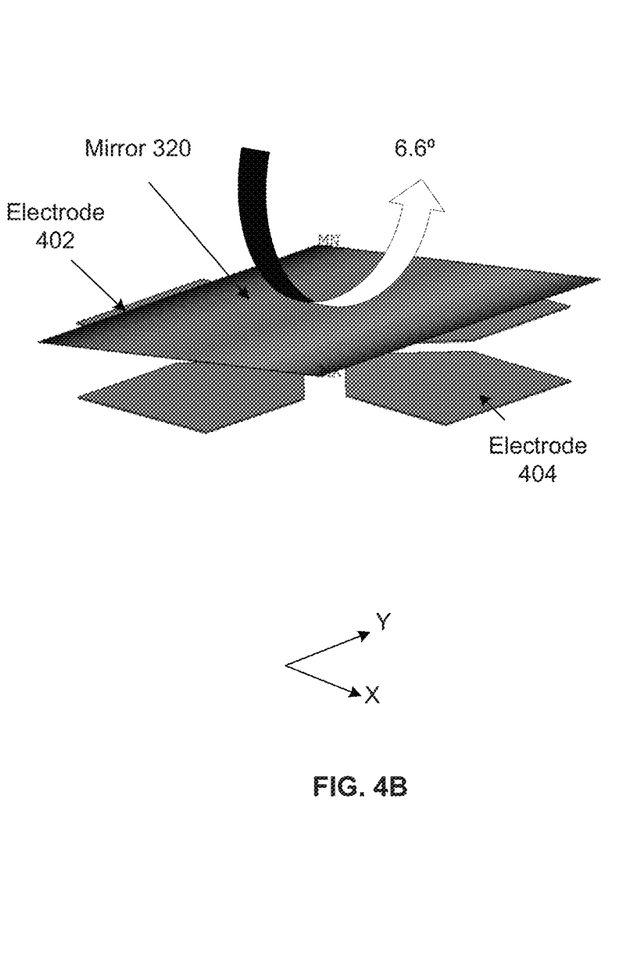
Figure 5A:
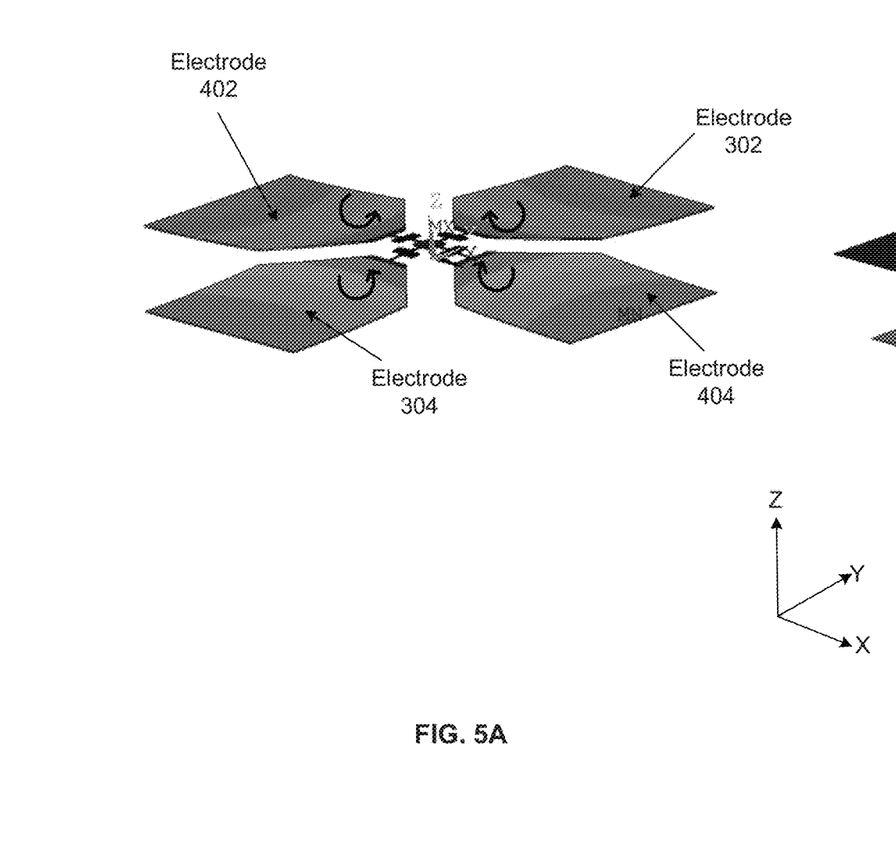
FIG. 5A and FIG. 5B illustrate a z-axis movement of an exemplary scanning mirror when potentials are applied to both first and second pairs of piezoelectric electrodes, according to embodiments of the disclosure.
Figure 5B:
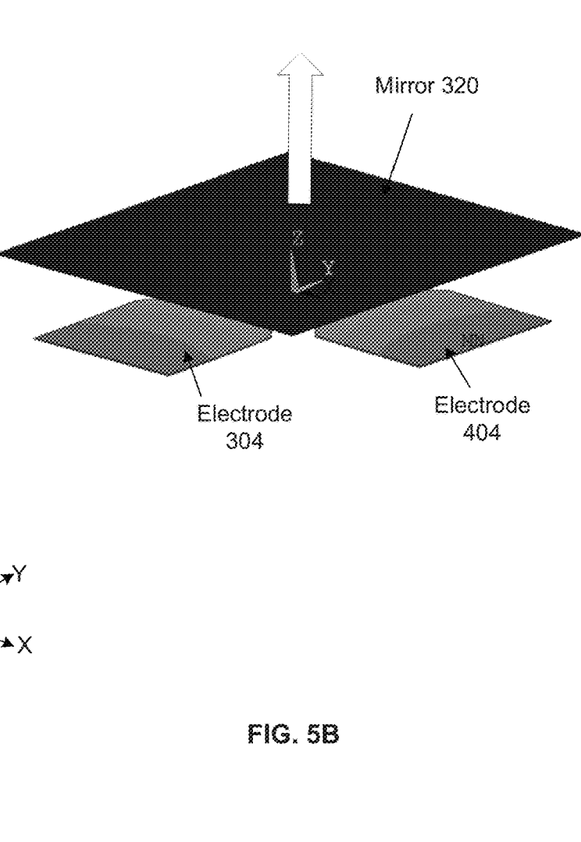
Figure 6:
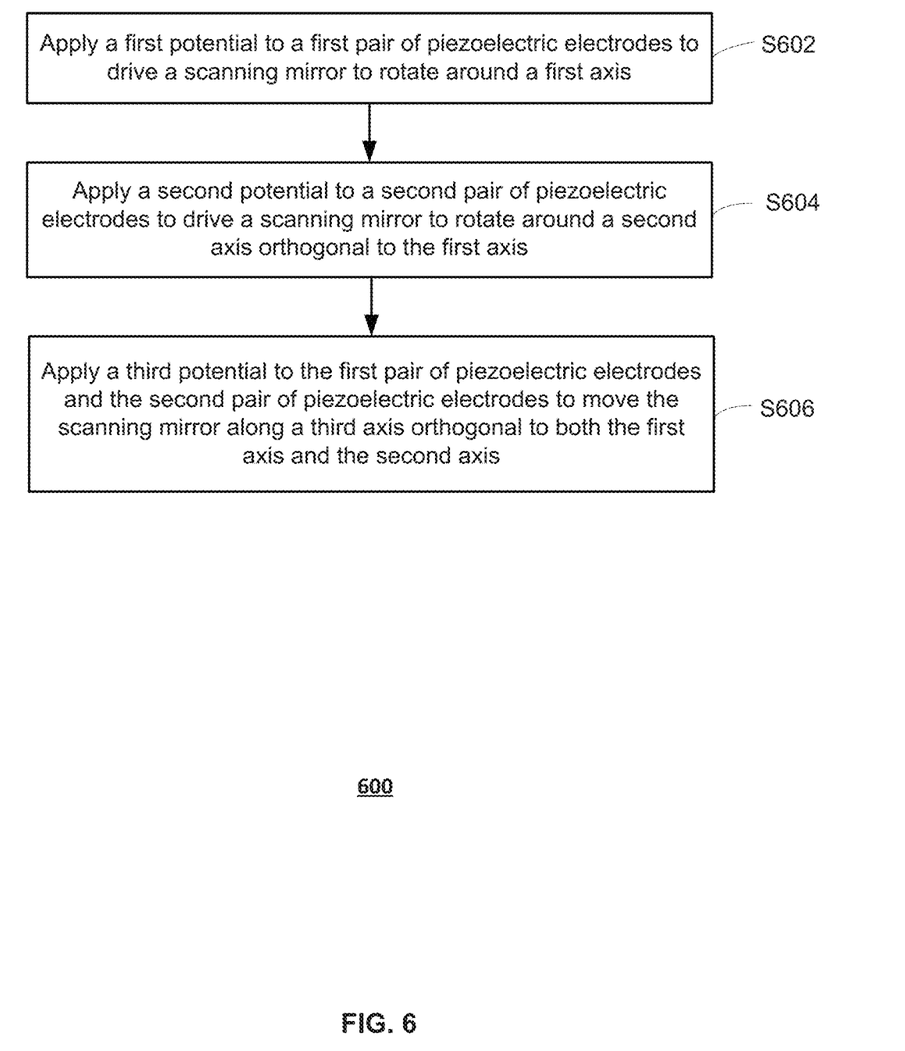
FIG. 6 is a flowchart of an exemplary process for operating a two-axis scanning mirror assembly, according to embodiments of the disclosure.

FIG. 3A and FIG. 3B illustrate an x-axis rotation of an exemplary scanning mirror 320 when a potential is applied to a first pair of piezoelectric electrodes, according to embodiments of the disclosure. Similarly, FIG. 4A and FIG. 4B illustrate a y-axis rotation of an exemplary scanning mirror 320 when a potential is applied to a second pair of piezoelectric electrodes, according to embodiments of the disclosure. FIG. 5A and FIG. 5B illustrate a z-axis movement of an exemplary scanning mirror 320 when potentials are applied to both first and second pairs of piezoelectric electrodes, according to embodiments of the disclosure. FIG. 6 is a flowchart of an exemplary process for operating a two-axis scanning mirror assembly, according to embodiments of the disclosure. As shown in FIG. 6, process 600 may include steps S602-S606 as described below. It is to be appreciated that some of the steps may be optional, and some of the steps may be performed simultaneously, or in a different order than shown in FIG. 6. FIGS. 3A-6 will be described together.

In step S602, a first potential is applied to a first pair of piezoelectric electrodes to drive the two-axis scanning mirror to rotate around a first axis. In the example embodiment illustrated in FIG. 3A, the first pair of piezoelectric electrodes for driving mirror 320 to rotate around the first axis (the x-axis) includes electrode 302 and electrode 304. When voltage potentials are applied to piezoelectric electrodes 302 and 304 (e.g., +15V to electrode 302 and −15V to electrode 304), the positive piezoelectric films (+) may bend electrode 302 upward (e.g., 90 μm up) relative to the anchor and the negative piezoelectric films (−) may bend electrode 304 downward (e.g., 90 μm down) relative to the anchor. Accordingly, a mechanical force is created to stretch/compress the torsion springs connected to the electrodes, which then cause the stage in the center to rotate, about the first axis (the x-axis). As the stage is bonded to mirror 320 (e.g., through a post), mirror 320 may be driven to oscillate around the first axis (the x-axis), as illustrated in FIG. 3B. For example, the rotation of mirror 320 under the 15V voltage potentials applied to electrodes 302 and 304 is about 6.6 degrees. Larger voltage potentials may result in a larger rotation range of mirror 320.

In step S604, a second potential is applied to a second pair of piezoelectric electrodes to drive the two-axis scanning mirror to rotate around a second axis. Similar to FIG. 3A, in the example embodiment illustrated in FIG. 4A, the second pair of piezoelectric electrodes for driving mirror 320 to rotate around the second axis (the y-axis) includes electrode 402 and electrode 404. When voltage potentials are applied to piezoelectric electrodes 402 and 404 (e.g., −15V to electrode 402 and +15V to electrode 404), the positive piezoelectric films (+) may bend electrode 404 upward (e.g., 90 μm up) relative to the anchor and the negative piezoelectric films (−) may bend electrode 402 downward (e.g., 90 μm down) relative to the anchor. Accordingly, the mechanical force is stretches/compresses the torsion springs connected to these electrodes, which then cause the stage in the center to rotate, about the second axis (the x-axis). Mirror 320 may be driven to oscillate around the second axis (the y-axis), as illustrated in FIG. 4B. Again, the rotation of mirror 320 under the 15V voltage potentials applied to electrodes 302 and 304 is about 6.6 degrees around y-axis. Accordingly, the FOV realized by the operation illustrated in FIG. 3B and FIG. 4B will be 6.6 degrees by 6.6 degrees.

In step S606, a third potential is applied to the first pair of piezoelectric electrodes and the second pair of piezoelectric electrodes to move the two-axis scanning mirror along a third axis orthogonal to both the first axis and the second axis. In the example embodiment illustrated in FIG. 5A, the first pair of piezoelectric electrodes includes electrode 302 and electrode 304, and the second pair of piezoelectric electrodes includes electrode 402 and electrode 404. When voltage potentials of the same polarity are applied to piezoelectric electrodes 302, 304, 402 and 404, the mechanical strains will bend all the electrodes up or down collectively, causing the stage to move up or down. For example, when a voltage potential of +15V is applied to each electrode, the positive piezoelectric films (+) may bend each electrode upward (e.g., 90 μm up), driving the stage to elevate along a third axis (the z-axis) orthogonal to both the first axis (the x-axis) and second axis (the y-axis). Because mirror 320 is bonded to the stage of the piezoelectric actuator through a rigid post, mirror 320 elevates along the z-axis accordingly.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A scanning mirror assembly, comprising:
   a two-dimensional micro-electromechanical system (MEMS) scanning mirror;
   a first pair of piezoelectric electrodes coupled to the MEMS scanning mirror through a first pair of looped torsion springs, wherein the first pair of piezoelectric electrodes drives the MEMS scanning mirror to rotate around a first axis; and
   a second pair of piezoelectric electrodes coupled to the MEMS scanning mirror through a second pair of looped torsion springs, wherein the second pair of piezoelectric electrodes drives the MEMS scanning mirror to rotate around a second axis orthogonal to the first axis,
   wherein at least one of the first pair of looped torsion springs or the second pair of looped torsion springs are multiple-looped torsion springs.

2. The scanning mirror assembly of claim 1, wherein the first pair of looped torsion springs join the second pair of looped torsion springs at a stage.

3. The scanning mirror assembly of claim 2, further comprising:
   a post protruding from the MEMS scanning mirror and configured to bond the MEMS scanning mirror to the stage.

4. The scanning mirror assembly of claim 1, wherein:
   the first pair of piezoelectric electrodes is configured to oscillate the MEMS scanning mirror around the first axis at a first frequency,
   the second pair of piezoelectric electrodes is configured to oscillate the MEMS scanning mirror around the second axis at a second frequency, and
   the first frequency is higher than the second frequency.

5. The scanning mirror assembly of claim 4, wherein the first pair of looped torsion springs has a first number of loops predetermined at least partially based on the first frequency, and the second pair of looped torsion springs has a second number of loops predetermined at least partially based on the second frequency.

6. The scanning mirror assembly of claim 1, wherein at least one of the first pair of looped torsion springs or the second pair of looped torsion springs are single-looped torsion springs.

7. The scanning mirror assembly of claim 1, wherein the first pair of looped torsion springs and the second pair of looped torsion springs are both multiple-looped torsion springs.

8. The scanning mirror assembly of claim 1, wherein the first pair of looped torsion springs are multiple-looped torsion springs and the second pair of looped torsion springs are single-looped torsion springs.

9. The scanning mirror assembly of claim 1, further comprising a ceramic substrate, wherein the first pair of piezoelectric electrodes and the second pair of piezoelectric electrodes are electrically connected to the ceramic substrate.

10. The scanning mirror assembly of claim 1, wherein the first pair of first electrodes or the second pair of piezoelectric electrodes comprises lead zirconate titanate (PZT) films coated on silicon plates.

11. The scanning mirror assembly of claim 1, wherein the MEMS scanning mirror comprises a single layer of silicon coated with a reflective metal layer.

12. A transmitter for an optical sensing system, comprising:
    a light source configured to emit a light beam; and
    a scanner for steering the light beam towards an object, the scanner comprising:
       a two-dimensional micro-electromechanical system (MEMS) scanning mirror;
       a first pair of piezoelectric electrodes coupled to the MEMS scanning mirror through a first pair of looped torsion springs, wherein the first pair of piezoelectric electrodes drives the MEMS scanning mirror to rotate around a first axis; and
       a second pair of piezoelectric electrodes coupled to the MEMS scanning mirror through a second pair of looped torsion springs, wherein the second pair of piezoelectric electrodes drive the MEMS scanning mirror to rotate around a second axis orthogonal to the first axis, wherein at least one of the first pair of looped torsion springs or the second pair of looped torsion springs are multiple-looped torsion springs.

13. The transmitter of claim 12, wherein:

the first pair of piezoelectric electrodes is configured to oscillate the MEMS scanning mirror around the first axis at a first frequency, the second pair of piezoelectric electrodes is configured to oscillate the MEMS scanning mirror around the second axis at a second frequency lower than the first frequency, the first pair of looped torsion springs has a first number of loops predetermined at least partially based on the first frequency, and the second pair of looped torsion springs has a second number of loops predetermined at least partially based on the second frequency.

14. The transmitter of claim 12, wherein at least one of the first pair of looped torsion springs or the second pair of looped torsion springs are single-looped torsion springs.

15. The transmitter of claim 12, wherein the first pair of looped torsion springs are multiple-looped torsion springs and the second pair of looped torsion springs are single-looped torsion springs.

16. The transmitter of claim 12, wherein the MEMS scanning mirror rotates comprises a single layer of silicon coated with a reflective metal layer.

17. A method for operating a scanner of an optical sensing system, comprising:

applying a first potential to a first pair of piezoelectric electrodes to drive a two-dimensional micro-electromechanical system (MEMS) scanning mirror to rotate around a first axis, wherein the first pair of piezoelectric electrodes is coupled to the MEMS scanning mirror through a first pair of looped torsion springs; and applying a second potential to a second pair of piezoelectric electrodes to drive the MEMS scanning mirror to independently rotate around a second axis orthogonal to the first axis, wherein the second pair of piezoelectric electrodes is coupled to the MEMS scanning mirror through a second pair of looped torsion springs, wherein at least one of the first pair of looped torsion springs or the second pair of looped torsion springs are multiple-looped torsion springs.

18. The method of claim 17, further comprising:

applying a third potential to the first pair of piezoelectric electrodes and the second pair of piezoelectric electrodes to move the MEMS scanning mirror along a third axis orthogonal to both the first axis and the second axis.

19. The method of claim 17, wherein the MEMS scanning mirror oscillates around the first axis at a first frequency and around the second axis at a second frequency, wherein the first frequency is higher than the second frequency, wherein the first pair of looped torsion springs has a first number of loops predetermined at least partially based on the first frequency, and the second pair of looped torsion springs has a second number of loops predetermined at least partially based on the second frequency.

20. The method of claim 17, wherein the first pair of looped torsion springs are multiple-looped torsion springs and the second pair of looped torsion springs are single-looped torsion springs.

* * * * *